Apr. 17, 1923.

E. H. BRISTOL 1,452,142

LIQUID HEAD GAUGE

Filed April 22, 1919

Inventor:
Edgar H. Bristol,

Patented Apr. 17, 1923.

1,452,142

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

LIQUID HEAD GAUGE.

Application filed April 22, 1919. Serial No. 291,940.

*To all whom it may concern:*

Be it known that I, EDGAR H. BRISTOL, a citizen of the United States, and a resident of Foxboro, county of Norfolk, and State of Massachusetts, have invented an Improvement in Liquid Head Gauges, of which the following description, in connection with the accompanying drawings, is a specification, like characters on the drawings representing like parts.

This invention relates to a device for measuring the head of a body of liquid. In perhaps the majority of cases the purpose would be to measure the depth of a body of liquid of substantially constant specific gravity, but the device can be utilized to show the head or pressure of a body of liquid of varying specific gravity and constant depth, and in that case serves to show the composition of the liquid.

Figure 1:
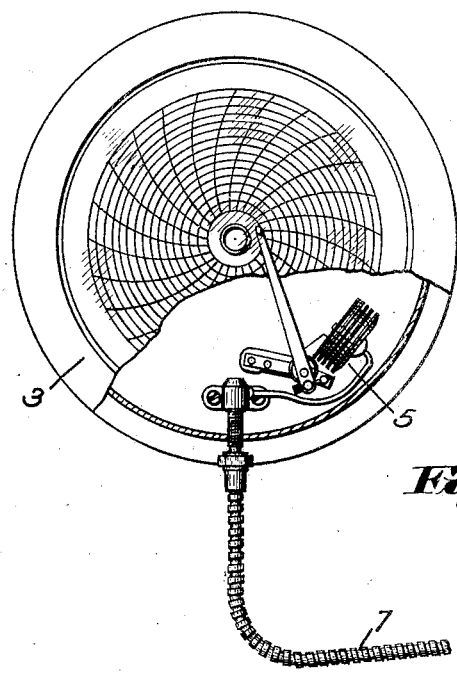
Figure 2:
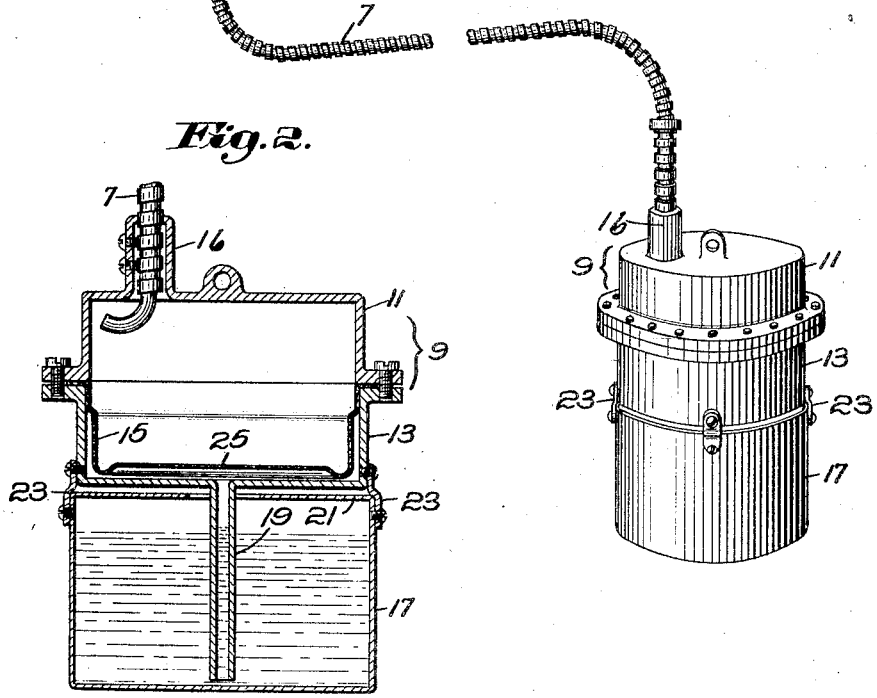

My invention will best be understood by reference to the following description of the illustrative embodiment thereof shown in the accompanying drawings wherein:

Figure 1 is a diagrammatic view, with parts broken away, showing a device embodying my invention; and Fig. 2 is a central vertical section through the part subjected directly to the action of the body of liquid which it is desired to measure.

Referring to Fig. 1, the head-measuring installation embodies a suitable pressure sensitive instrument 3 which may be of either the indicating or the recording type, the latter being shown in the present instance, this instrument having a working device 5 which may be in the form of a suitable set of diaphragms forming an expansible tube of well known type. The interior of the working device 5 is in communication through a pipe 7 by an air-tight joint of small gauge with a device 9, hereinafter more fully to be described directly exposed to the pressure which it is desired to measure and serving as a means whereby a distant pressure operates the working device 5 and is measured by the movement thereof.

Referring to Fig. 2, the device 9 may embody a casing conveniently formed of two opposed cup-shaped members 11 and 13 having flanges which are secured together and which clamp the edges of a flaccid, freely flexible, cup-shaped diaphragm 15, preferably of a special form hereinafter to be more fully referred to, which diaphragm may normally hang down in the cup-shaped member 13. The diaphragm 15 thus divides the casing into two chambers, the upper one of which is entered by the pipe 7 through the connection 16 and the lower one of which is open to the action of the pressure which it is desired to measure. It will be understood that the device 9 is submerged in the body of liquid whose head it is desired to measure, either by sinking it directly therein or obtaining a similar result by means of suitable pipe connections. The pressure due to the head of liquid will act in a manner hereinafter to be described on the under side of the diaphragm which is of such nature that it has no appreciable resistance to movement under this pressure, the diaphragm serving simply as a physical means of separation, confining the body of air in the upper cup 11, pipe 7 and working device 5 and isolating it from the fluid acting on the under side of the diaphragm. The pressure due to the head of liquid will compress the air column above the diaphragm and cause measuring movement of the working device 5.

In certain installations it has been possible to utilize an instrument of this type by admitting the liquid the head of which was to be measured directly to the chamber formed by the cup 13, but in other instances the liquid would act to destroy the separating diaphragm 15. The diaphragm is usually made of rubber and as an example of a liquid which would destroy it I may mention oil.

In accordance with my invention I provide means whereby the pressure of a body of oil or other liquid may be indirectly transmitted to the air column above the diaphragm 15, and for this purpose I utilize a receptacle 17 which forms a reservoir for a suitable inert liquid not harmful to the diaphragm and which will not mix with the liquid measured. For example, water may be used in connection with oil. I have herein shown the receptacle 17 as suspended beneath the chamber formed by the cup-shaped members 11 and 13, and the lower cup-shaped member may be provided with a depending neck 19 extending into the receptacle 17 and dipping into the water or other inert liquid with which it is filled, the level of the liquid normally being below the level of the diaphragm, as shown. The neck 19 dipping into the liquid in the receptacle 17 forms two communicating liquid-receiving wells, an inner well opening to the lower chamber in the casing and an outer annular well open at the top so that the head of the liquid measured may act upon the top of the column of liquid in the well. The exterior well forms a reservoir of comparatively great volume providing an ample body of inert liquid to rise in the well 19, filling the chamber 13, displacing the diaphragm and compressing the column of air above the same. The inert liquid in the chamber acts as a fluid piston to compress the air column while the diaphragm serves as a movable partition separating the body of liquid from the body of air, none of which can escape in such a manner as to vitiate the reading of the instrument. The body of liquid in the reservoir 17 completely protects the diaphragm from contact with the liquid which is to be measured and which might be harmful to the same.

To facilitate the handling of the device 9, the receptacle 17 may be partially closed at the top, as indicated at 21, leaving, however, an opening around the neck 19 permitting free entry of the liquid to be measured to the top of the column of liquid in the annular well surrounding the neck 19. Conveniently the receptacle 17 is of the same general form as the cup-shaped members 11 and 13 and may be suspended from the member 13 by straps 23.

Preferably I utilize the form of diaphragm shown in Fig. 2 and consisting of a cup-shaped member having approximately the form of the cup 13 and provided with a flange to be clamped between the flanges of the members 11 and 13. The bottom of the diaphragm, however, is preferably offset upwardly or inset as indicated at 25. It will be recalled that the diaphragm is freely flexible and offers substantially no resistance to upward movement from the position shown in Fig. 2. Similarly, the inset bottom 25 has a limited downward movement substantially unresisted. When the device 9 is connected to the instrument 3 by securing the pipe 7 in place and the diaphragm is positioned freely under gravity, the column of air above it has a certain normal volume. Under different conditions of temperature arising either from the temperature of the liquid the head of which is to be measured or the temperature of the atmosphere surrounding the recording instrument, the air in this column will expand and unless provision is made for permitting a change in the volume of the column, a pressure will be induced which will affect the sensitive working device 5. Herein the inset bottom portion of the diaphragm is freely yieldable downwardly in compensation for such an increase in pressure, so that in spite of variations in temperature no movement of the working device will take place, but the measuring instrument will show correctly the head of the liquid at all times. The offset bottom portion 25 also facilitates the upward collapsing of the diaphragm by a sort of rolling up motion of the depending walls thereof.

Having thus described the illustrative embodiment of my invention shown in the accompanying drawings by way of an example, the principles exemplified thereby which I claim as new and desire to secure by Letters Patent I shall express in the following claims:—

1. In a device for measuring the head of liquids, an instrument having a pressure-operated device, a pipe extending therefrom, a casing into which said pipe opens and means providing a pair of connected liquid-containing wells, one opening to the casing and the other exposed for pressure of a liquid head thereon.

2. In a device for measuring the head of liquids, an instrument having a pressure-operated device, a pipe extending therefrom, a casing into which said pipe opens, a freely flexible diaphragm dividing the casing beneath the point where said pipe opens thereto and providing upper and lower chambers, the upper of which is in communication with said pressure operated device through said pipe, and a liquid reservoir below the level of said diaphragm and in communication with the space beneath.

3. In a device for measuring the head of liquids, a casing to be placed below the surface of the liquid having a movable partition dividing the receptacle into upper and lower chambers, a tube opening from the lower chamber and a receptacle suspended from the casing into which said tube extends.

4. In a device for measuring the head of liquids, a casing to be placed below the surface of the liquid having a flexible diaphragm dividing the same, a relatively large receptacle of inert liquid the level of which is below said diaphragm, and a small connection leading from the casing and opening in the receptacle beneath the surface of the liquid.

5. In a device for measuring the head of liquids, a casing to be placed below the surface of the liquid comprising opposed cup-shaped members, a diaphragm clamped between them, a tubular neck depending from one of the members and a relatively large open-topped receptacle receiving a supply of inert liquid into which said neck dips.

6. In a device for measuring the head of liquids, an instrument having a pressure-operated device, a pipe extending therefrom, a casing into which said pipe opens, a freely flexible diaphragm dividing the casing beneath the point where said pipe opens thereto and providing upper and lower chambers, the upper of which is in communication with said pressure operated device through said pipe, a reservoir of inert liquid associated with said casing and in communication with said lower chamber, the body of inert liquid adapted to be exposed to the pressure of the head to be measured and to serve in the manner of a liquid piston to transmit pressure through said pipe to the pressure operated device.

7. In a device for measuring the head of liquids an instrument having a pressure-operated device, a pipe extending therefrom and pressure transmitting mechanism adapted to be placed below the level of the liquid comprising a pair of liquid-receiving wells and a body of inert liquid in the wells, said pipe opening above the liquid column in one wall to transmit the pressure thereabove and the column in the other well being exposed to receive the pressure of a liquid head thereon.

8. In a device for measuring the head of liquids an instrument having a pressure-operated device, a pipe extending from said device, a casing into which the pipe opens and means dividing the casing comprising a diaphragm marginally secured to the wall of said casing and having a limp, freely flexible, cup-shaped body depending therefrom, said body having an upwardly offset bottom portion.

9. A separating diaphragm for an instrument of the class described comprising a limp, freely flexible cup-shaped body adapted to be collapsed upwardly from the bottom thereof without substantial resistance and having an upwardly offset bottom.

In testimony whereof, I have signed my name to this specification.

EDGAR H. BRISTOL.